(12) United States Patent
Simone et al.

(10) Patent No.: US 11,131,437 B2
(45) Date of Patent: Sep. 28, 2021

(54) CONNECTING ARRANGEMENT FOR THE ADHESIVE CONNECTION OF A POSITIONALLY SENSITIVE ELEMENT TO A RECEIVING BODY

(71) Applicant: HELLA GmbH & Co. KGaA, Lippstadt (DE)

(72) Inventors: Rohrberg Simone, Lippstadt (DE); Konrad Schuerhoff, Rietberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 666 days.

(21) Appl. No.: 15/959,808

(22) Filed: Apr. 23, 2018

(65) Prior Publication Data

US 2018/0238509 A1 Aug. 23, 2018

Related U.S. Application Data

(63) Continuation of application No. PCT/EP2016/074321, filed on Oct. 11, 2016.

(30) Foreign Application Priority Data

Oct. 23, 2015 (DE) .................... 10 2015 118 100.2

(51) Int. Cl.
| | |
|---|---|
| *F21S 41/19* | (2018.01) |
| *F21S 41/39* | (2018.01) |
| *F21S 43/19* | (2018.01) |
| *F21S 43/37* | (2018.01) |
| *C09J 5/00* | (2006.01) |

(Continued)

(52) U.S. Cl.
CPC .............. *F21S 41/192* (2018.01); *C09J 5/00* (2013.01); *C09J 5/02* (2013.01); *C09J 201/00* (2013.01);
(Continued)

(58) Field of Classification Search
CPC .......... F21S 41/192; F21S 41/19; F21S 43/19; F21S 43/37; C09J 5/00; C09J 5/02;
(Continued)

(56) References Cited

U.S. PATENT DOCUMENTS

| 4,459,120 A * | 7/1984 | Tyler ........................ H01K 1/34 |
|---|---|---|
| | | 445/27 |
| 6,238,508 B1* | 5/2001 | Hauer ........................ C09J 5/06 |
| | | 156/273.3 |

(Continued)

FOREIGN PATENT DOCUMENTS

| DE | 68906642 T2 | 12/1993 |
|---|---|---|
| DE | 19739580 A1 | 3/1999 |

(Continued)

OTHER PUBLICATIONS

Anonymus; "Ultraviolettstrahlung"; Roempp Online Version 4.0; Mar. 1, 2002 (Mar. 1, 2002); pp. 1-4; XP055327664; Retrieved from the Internet <URL:https://roempp.thieme.de/roempp4.0/do/data/RD-21-00239> [retrieved on Dec. 9, 2016].

(Continued)

*Primary Examiner* — Rajarshi Chakraborty
*Assistant Examiner* — Nathaniel J Lee
(74) *Attorney, Agent, or Firm* — Muncy, Geissler, Olds & Lowe, P.C.

(57) ABSTRACT

A bonding arrangement and a method for the adhesive bonding of a position-sensitive element to a receiving body, in particular of an optical element, such as a semiconductor light source, a reflector, or the like, wherein a UV-curable adhesive is arranged between the position-sensitive element and the receiving body. Provision is made that the bond between the position-sensitive element and the receiving body has at least one cavity for accommodating the UV-curable adhesive and at least one retaining element that extends into the cavity and projects into the UV-curable adhesive. The cavity has a bottom section that is designed to be sufficiently thin-walled that the adhesive can be cured with UV light that can be radiated through the bottom section.

11 Claims, 2 Drawing Sheets

(51) Int. Cl.
*C09J 5/02* (2006.01)
*C09J 201/00* (2006.01)
*F21Y 115/00* (2016.01)
*F21S 45/47* (2018.01)

(52) U.S. Cl.
CPC ............... *F21S 41/19* (2018.01); *F21S 41/39* (2018.01); *F21S 43/19* (2018.01); *F21S 43/37* (2018.01); *C09J 2301/416* (2020.08); *C09J 2467/006* (2013.01); *F21S 45/47* (2018.01); *F21Y 2115/00* (2016.08)

(58) Field of Classification Search
CPC ...... C09J 201/00; B29C 66/3034; H01K 1/36; H01K 3/12
See application file for complete search history.

(56) References Cited

U.S. PATENT DOCUMENTS

| 6,811,285 B2* | 11/2004 | Ferguson | ............ F21S 48/1208 362/267 |
|---|---|---|---|
| 2008/0118751 A1 | 5/2008 | Zollner et al. | |
| 2013/0270749 A1* | 10/2013 | Hachtmann | ........... B29C 66/301 264/496 |
| 2014/0268850 A1* | 9/2014 | Marley | ................. F21S 41/192 362/517 |

FOREIGN PATENT DOCUMENTS

| DE | 19856333 A1 | 6/2000 |
| DE | 10 2012 221 174 A1 | 5/2014 |
| WO | WO 2006/027388 A1 | 3/2006 |

OTHER PUBLICATIONS

"Lambert-Beersches Gesetz"; Römpp Online, Version 3.23; Dokumentkennung RD-12-00270; Jan. 1, 2012 (Jan. 1, 2012); XP055025621; Retrieved from the Internet <URL:http://www.roempp.com/prod/> [retrieved on Apr. 25, 2012].

International Search Report dated Dec. 21, 2016 in corresponding application PCT/EP2016/074321.

* cited by examiner

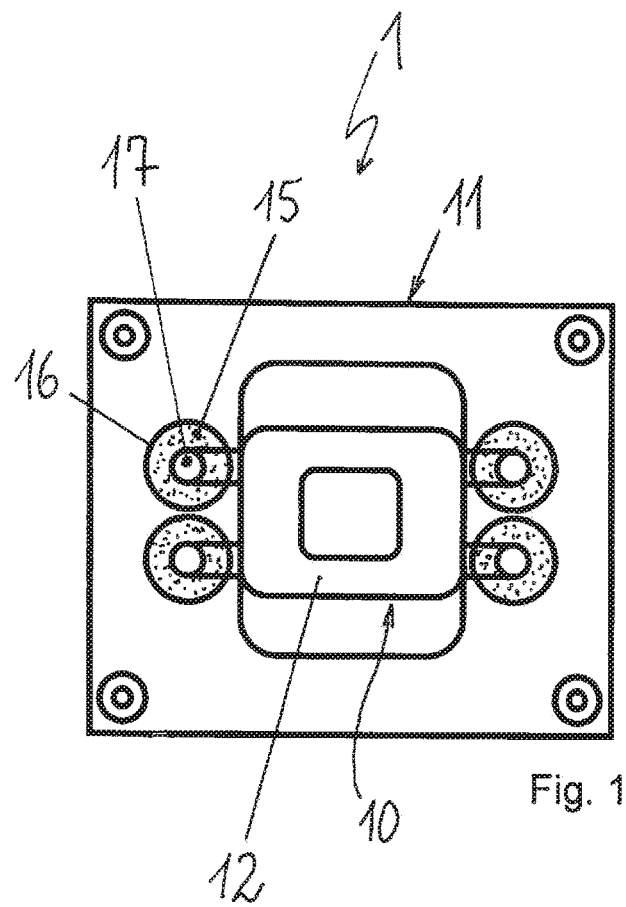
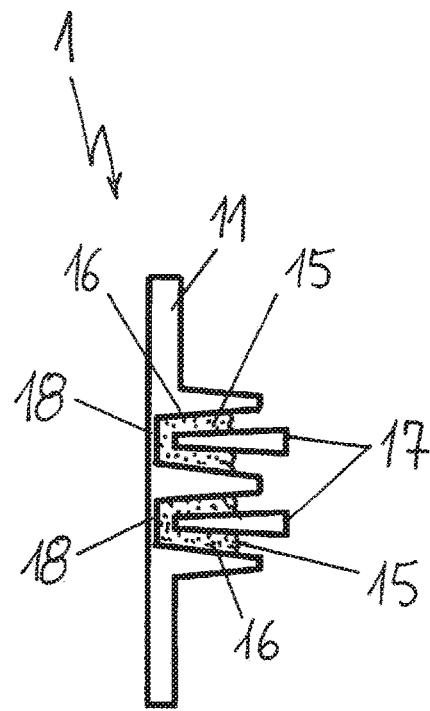
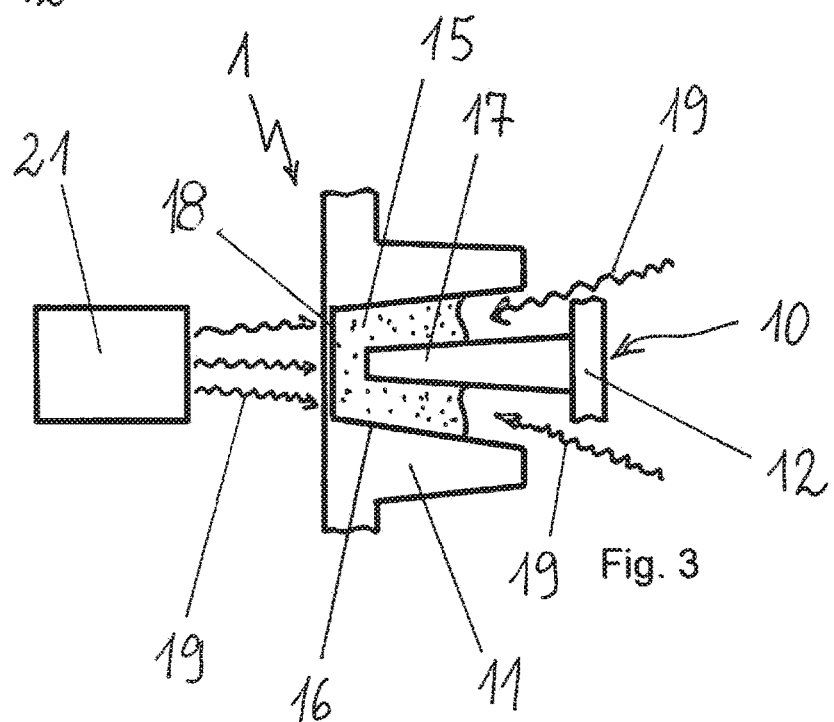
Fig. 1
Fig. 2
Fig. 3

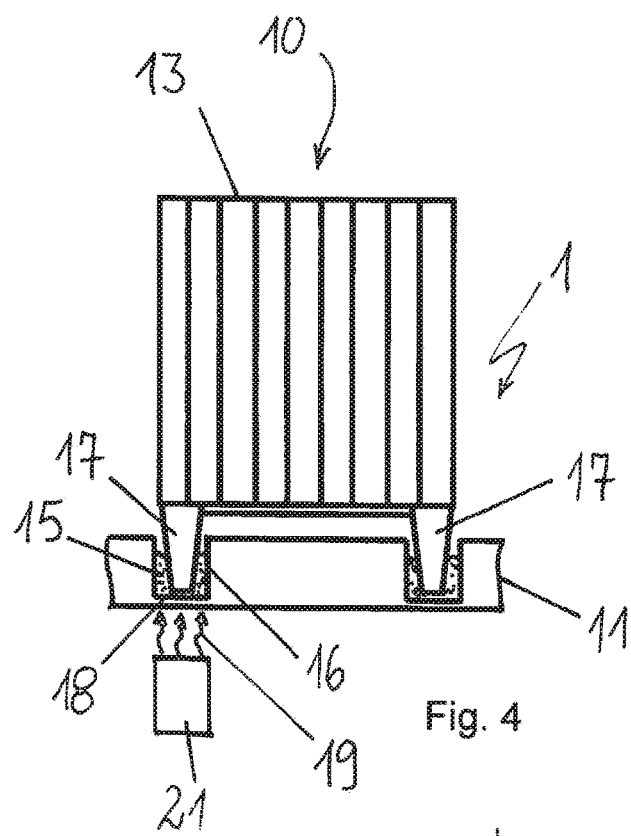
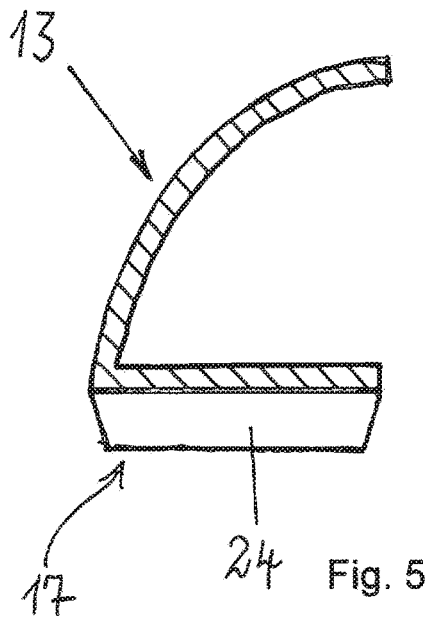
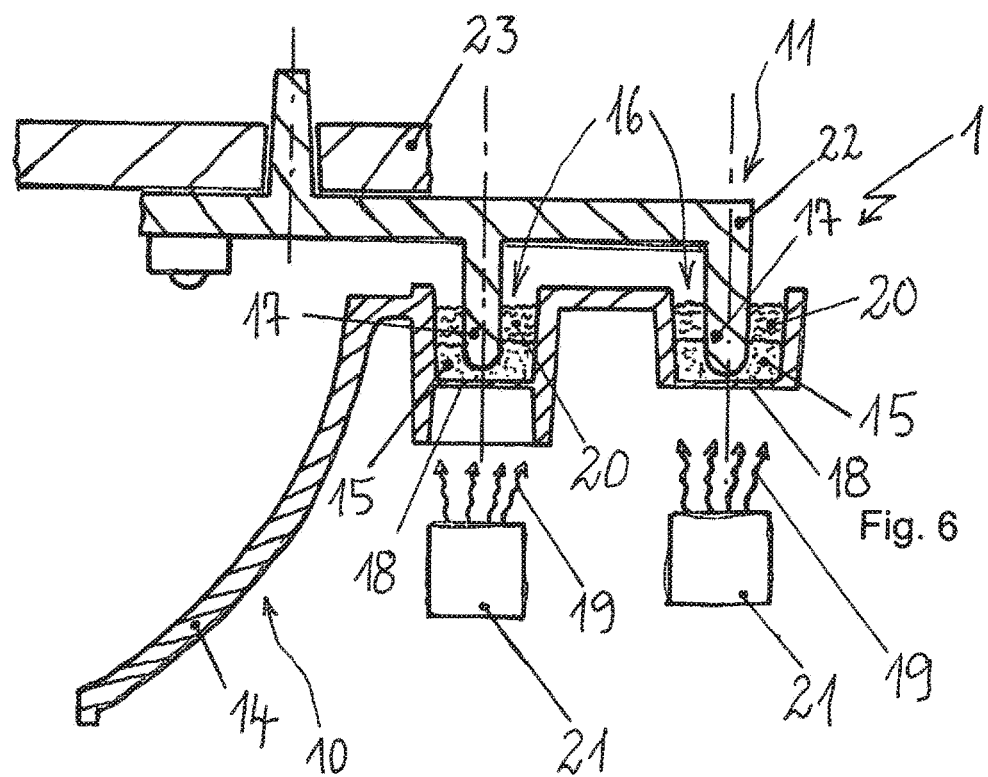

CONNECTING ARRANGEMENT FOR THE ADHESIVE CONNECTION OF A POSITIONALLY SENSITIVE ELEMENT TO A RECEIVING BODY

This nonprovisional application is a continuation of International Application No. PCT/EP2016/074321, which was filed on Oct. 11, 2016, and which claims priority to German Patent Application No. 10 2015 118 100.2, which was filed in Germany on Oct. 23, 2015, and which are both herein incorporated by reference.

BACKGROUND OF THE INVENTION

Field of the Invention

The present invention relates to a bonding arrangement for the adhesive bonding of a position-sensitive element to a receiving body, in particular of an optical element, such as a semiconductor light source, a reflector, or the like, wherein a UV-curable adhesive is arranged between the position-sensitive element and the receiving body.

Description of the Background Art

Bonding arrangements are based on UV-curable adhesive, and adjustment can take place between the position-sensitive element, for example an optical element, and the receiving body as long as the UV-curable adhesive has not yet cured. The adjustment and subsequent curing can take place, for example, between a semiconductor light source such as an LED or a laser light source and a reflector of a headlight, and the semiconductor light source must be aligned with the reflector with very accurate positioning. The alignment here is relative, which is to say that the position-sensitive element can be aligned with respect to the stationary receiving body, or the receiving body can be aligned with respect to the stationary position-sensitive element. Frequently the semiconductor light source is arranged on the receiving body, and the position-sensitive element relates to a reflector that must be adjusted relative to the receiving body, on which the light source rests in turn. In the sense of the term in its present usage, therefore, "position-sensitive element" relates to an element that must be adjusted relative to the receiving body so that the receiving body is similarly adjusted with respect to the position-sensitive element by the relative adjustment. The bonding arrangement in this case has the UV-curable adhesive arranged between the position-sensitive element and the receiving body.

For example, DE 198 56 333 A1, which corresponds to U.S. Pat. No. 6,238,508, shows a bonding arrangement between two parts, and the two parts are first aligned relative to one another by means of an adjustment device. Next, a UV-curable adhesive is used that is arranged on the exterior between the two parts so that UV light can be shone on the UV-curable adhesive with a UV light source. However, depending on the design of the position-sensitive element and the receiving body, such accessibility of the UV-curable adhesive is not always provided. The arrangement from DE 198 56 333 A1 additionally has an adhesive layer, which is first arranged between the two parts that are to be adjusted, and the UV-curable adhesive serves merely to temporarily fix the two parts to one another once they are adjusted relative to one another with the adjustment device. A UV light source is used to direct UV light onto the UV-curable adhesive so that the latter cures and fixing is achieved. The two parts that are adjusted relative to one another can then be removed from the adjustment device, and a layer of adhesive is arranged between the two parts that constitutes the actual load-bearing structural adhesive. Curing of the adhesive layer takes place outside of the adjustment device, for example in an oven. Consequently, the UV-curable adhesive is used merely as temporary fixing for the mutually adjusted parts.

The requirement for the UV light of the UV light source to be able to access the UV-curable adhesive gives rise to limitations in the structural design of the position-sensitive element relative to the receiving body, with the result that not every bonding arrangement can be implemented with the bonding methods based on a UV-curable adhesive known from the prior art.

SUMMARY OF THE INVENTION

It is therefore an object of the present invention to provide a bonding arrangement for the adhesive bonding of two parts, for example of a position-sensitive element and a receiving body, wherein the structural design of the position-sensitive elements and of the receiving body has maximum freedom, wherein a UV-curable adhesive is to be used between the position-sensitive element and the receiving body.

In an exemplary embodiment, a bond between the position-sensitive element and the receiving body has the following: at least one cavity for accommodating the UV-curable adhesive and at least one retaining element that extends into the cavity and projects into the UV-curable adhesive, wherein the cavity has a bottom section that is designed to be sufficiently thin-walled that the adhesive can be cured with UV light that can be radiated through the bottom section.

Provided is the creation of a bottom section that is at least partially transparent to the UV light, and through which UV light can be radiated into the cavity in order to irradiate the UV-curable adhesive contained in the cavity with UV light. This results in expanded design freedom, since it is no longer necessary to take care to radiate the UV light into the cavity from the opening side, with the insertion side of the position-sensitive element likewise entering the cavity from above. The invention makes it possible to radiate the UV light in opposite the position-sensitive element, so that, e.g., an optical element does not hinder the arrangement of the UV light source. In most cases, the UV light source can be arranged opposite the optical element, since the bottom section of the arrangement is also designed to be opposite the position-sensitive element. As a result of the inventive development of the bonding arrangement, significant improvements in the manageability of the UV-curable adhesive arise, especially when the position-sensitive element essentially completely covers the opening side of the cavity that is open to the top.

According to an embodiment of the inventive bonding arrangement, the bottom side of the cavity is filled with the UV-curable adhesive and provision is made that a structural adhesive is additionally contained in the cavity. The UV-curable adhesive can be used in this design to fix the adjusted position of the position-sensitive element relative to the receiving body in that the UV-curable adhesive is rapidly cured by irradiation with UV light after adjustment of the position-sensitive element relative to the receiving body. After that, the structural adhesive can cure slowly, wherein the position of the position-sensitive element relative to the receiving body no longer changes, even during the curing period for the structural adhesive. The structural adhesive can be placed in the cavity even before irradiation of the UV-curable adhesive with the UV light in this design. In the same manner, a bonding arrangement can be created in which the curing of the UV-curable adhesive takes place first, and the structural adhesive is subsequently placed in the cavity.

The structural adhesive can be added to the surface of the UV-curable adhesive so that portions of the retaining element pass through the structural adhesive. The dispensing of the structural adhesive onto the surface of the UV-curable adhesive can take place before or after the UV curing of the UV-curable adhesive in this case.

The cavity can be formed on the receiving body or on the position-sensitive element. Preferably, the cavity is formed on the receiving body. However, depending on the design of the position-sensitive element, for example as a reflector, the cavity can also be implemented on the position-sensitive element, depending in particular on the installation position in which the cavity is present. In particular, the cavity should be implemented on the particular element or body that has an installation position in which the UV-curable adhesive can remain in the cavity without running out when the adhesive is not yet cured. Consequently, the retaining element can be formed on the position-sensitive element or alternatively on the receiving body. Each unit in the pair consisting of body and element to be adjusted relative to one another consequently has either at least one cavity or at least one retaining element.

The bottom section can have a thickness of 20 μm to 500 μm, preferably 50 μm to 200 μm, and especially preferably 100 μm. In this context, the thickness of the bottom section is determined such that it still has the necessary stability with no risk of breakage of the bottom section, in particular during handling of the bonding arrangement. However, the bottom section preferably is chosen to be thin enough that an ordinary UV light source that is used commercially can shine through the bottom section with a suitable ordinary intensity of the UV light.

A further advantage is achieved when the bottom section is designed as a single piece with and, in particular, of uniform material with the receiving body, and in the same manner, an advantage arises when the bottom section is designed as a single piece with and, in particular, of uniform material with the position-sensitive element. For example, the receiving body, alternatively also the position-sensitive element, can have a polymer-based plastic including a BMC. BMC plastics are so-called bulk molding compound plastics, which are provided with additional fiber components. Such plastics can easily be manufactured in hot pressing processes, in particular including with a bottom section having a thickness from, e.g., 20 μm to 500 μm. The receiving body thus has, in particular, a thermoset plastic, producing particular advantages with regard to small possible tolerances, very low distortion, and very low shrinkage.

The invention is additionally directed toward a method for producing a bonding arrangement for the adhesive bonding of a position-sensitive element to a receiving body, in particular of an optical element, such as a semiconductor light source, a reflector, or the like, wherein a UV-curable adhesive is arranged between the position-sensitive element and the receiving body, and wherein the method has at least the following steps: forming a cavity on the receiving body or on the position-sensitive element, forming a retaining element on the position-sensitive element or on the receiving body, inserting the retaining element in the cavity, filling the cavity with the UV-curable adhesive so that the retaining element projects into the UV-curable adhesive, and irradiating the UV-curable adhesive by means of UV light through a thin-walled bottom section of the cavity.

According to an embodiment, a structural adhesive can additionally be placed in the cavity. The addition of the structural adhesive can take place in this case before or after the curing of the UV-curable adhesive with UV light.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a top view of an exemplary embodiment of a bonding arrangement with the features of the present invention, FIG. 2 is a partial side view of the bonding arrangement from FIG. 1, FIG. 3 is an enlarged view of a cavity with a retaining element projecting into the cavity, wherein the cavity is filled with a UV-curable adhesive, FIG. 4 is another exemplary embodiment of a position-sensitive element arranged on a receiving body, wherein the position-sensitive element is implemented as a reflector, FIG. 5 is a side view of the reflector from FIG. 4, and FIG. 6 is another bonding arrangement with a reflector arranged on a receiving body.

DETAILED DESCRIPTION

FIGS. 1 and 2 show a first exemplary embodiment of a bonding arrangement 1 in a top view (FIG. 1) and in a cross-sectional side view (FIG. 2). The bonding arrangement 1 serves to adhesively bond a position-sensitive element 10, shown as a semiconductor light source 12 by way of example, to a receiving body 11. The bond is accomplished with a UV-curable adhesive 15 that fixes an adjusted position of the semiconductor light source 12 relative to the receiving body 11 by a curing process.

The term "UV-curable adhesive" is understood according to the invention to mean any adhesive that cures under the influence of light, wherein the wavelength of the light is typically in a range from 200 nm to 500 nm. Accordingly, "UV light" is understood to mean, in particular, light with a wavelength in the range from 200 nm to 500 nm.

Formed on the receiving body 11 are cavities 16, four of them by way of example. On the semiconductor light source 12, four retaining elements 17 are likewise implemented that project into the cavities 16, as the cross-sectional view in FIG. 2 makes clear. The cavities 16 are at least partially filled with the UV-curable adhesive 15.

Once the position-sensitive element 10, which is to say the semiconductor light source 12, for example, has been brought into the required position relative to the receiving body 11, for example by a suitable manipulator, then the adjusted position is fixed with the UV-curable adhesive 15.

To this end, the UV-curable adhesive 15 is irradiated with UV light, for which purpose the cavities 16 have, according to the invention, a bottom section 18 that is designed to be sufficiently thin that the UV light can radiate through the bottom section 18 into the adhesive 15.

For this purpose, FIG. 3 shows an enlarged view of the cavity 16 in the receiving body 11, and the retaining element 17 located on the semiconductor light source 12 has been inserted into the cavity 16. The cavity 16 is filled with UV-curable adhesive 15. Additionally shown is a UV light source 21 for providing UV light 19 that radiates through the thin bottom section 18 of the receiving body 11. Radiation of the UV light 19 into the adhesive 15 takes place as a result, so that the latter is cured. As is indicated in FIG. 3, the UV-curable adhesive 15 can additionally be illuminated with UV light 19 that is radiated in from the side of the position-sensitive element 10. Once the UV-curable adhesive 15 has cured following exposure to the UV light 19, the bonding arrangement 1 can be removed from the manipulator, with the position of the position-sensitive element 10 relative to the receiving body 11 being fixed by the cured adhesive 15.

FIG. 4 shows another exemplary embodiment of a bonding arrangement 1 with a position-sensitive element 10, which is implemented as a reflector 13 as an example. Formed on the underside of the reflector 13 are retaining elements 17, which can be implemented as retaining fins 24, as shown in detail in FIG. 5.

The retaining elements 17 project into cavities 16 that have been made in the receiving body 11. The cavities 16 are at least partially filled with UV-curable adhesive 15, into which the retaining elements 17 project.

Shown on the left-hand cavity 16 by way of example is the arrangement of the UV light source 21 for providing UV light 19 that radiates through the bottom section 18 in the receiving body 11 in order to irradiate and cure the adhesive 15.

FIG. 6 shows a variant of the bonding arrangement 1 with cavities 16 that are formed on the position-sensitive element 10. The position-sensitive element 10, shown as an optical element in the form of a reflector 14 by way of example, is arranged such that the openings of the cavities 16 face upward opposite the force of gravity. The UV-curable adhesive 15 can thus be dispensed into the cavities 16. After that, the retaining elements 17 on the receiving body 11, composed of a heat sink 22 for example, are plunged into the adhesive 15. On the bottom side, the cavities have the bottom sections 18, through which the UV light 19 can be radiated into the adhesive 15 by means of the UV light sources 21.

The bonding arrangement 1 is held on a carrier 23. The reflector 14 points downward so that the cavities 16 are open to the top. Located above the cavities 16 is the receiving body 11, for example in the form of a heat sink 22, on which a light source is also mounted, for example an LED semiconductor light source or a laser light source. Such light sources require precise alignment relative to the reflector 14. To this end, the UV-curable adhesive 15 is first placed in the cavities 16. While the adhesive 15 is not yet cured, adjustment of the heat sink 22 or of the light source takes place relative to the reflector 14. Once the adjustment is complete, the adhesive 15 is cured by irradiation with the UV light, by which means the relative alignment of the heat sink 22 or of the light source and the reflector 14 is fixed. After that, a structural adhesive 20, which can cure over a longer period of time independently of the already-cured UV-curable adhesive 15, is additionally dispensed into the cavities 16.

The precisely positioned arrangement of the reflector 14 on the receiving body 11, for example on the heat sink 22, does not change in this process. Alternatively, the two adhesives 15 and 20 can also be dispensed into the cavities 16 to start with, and the retaining elements 17 can be inserted into the cavities 16 subsequently. If an exposure of the UV-curable adhesive 15 to the UV light 19 takes place after that, then the UV-curable adhesive 15 cures regardless of whether or not the structural adhesive 20 has already been introduced. In this case, the structural adhesive 20 serves primarily to provide, e.g., the final, load-bearing adhesive bond between the position-sensitive element 10 and the receiving body 11, whereas the fast-curing UV-curable adhesive 15 serves mainly to fix the adjusted position. Consequently, the result is achieved that it is not necessary for the adjusted position to remain in, e.g., an adjustment device or a manipulator during a relatively long curing period for the structural adhesive 20. Instead, due to the fast curing of the UV-curable adhesive 15, the bonding arrangement 1 can be moved on to a handling system even while the structural adhesive 20 is still curing.

The invention is not limited in its implementation to the preferred exemplary embodiments provided above. Instead, a number of variants are possible that make use of the described solution even in embodiments that are fundamentally different in nature. All features and/or advantages, including design details and spatial arrangements, that derive from the claims, the description, or the drawings, can be essential for the invention individually as well as in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bonding arrangement for an adhesive bonding of a position-sensitive element to a receiving body of an optical element, the bonding arrangement comprising:
   a UV-curable adhesive arranged between the position-sensitive element and the receiving body;
   at least one cavity for accommodating the UV-curable adhesive; and
   at least one retaining element that extends into the cavity and projects into the UV-curable adhesive,
   wherein the cavity has a bottom section that is provided at a deepest point of the cavity, and wherein an entirety of the bottom section is configured to be sufficiently thin-walled such that the UV-curable adhesive is cured with UV light that is radiated through the bottom section, and
   wherein the cavity is fully enclosed except for an opening at an upper end of the cavity, wherein the opening opposes the bottom section.

2. The bonding arrangement according to claim 1, wherein the cavity is at least partially filled with the UV-curable adhesive, and wherein a structural adhesive is additionally contained in the cavity.

3. The bonding arrangement according to claim 2, wherein the structural adhesive is added to the surface of the UV-curable adhesive, and wherein portions of the retaining element pass through the structural adhesive.

4. The bonding arrangement according to claim 1, wherein the cavity is formed on the receiving body or on the position-sensitive element.

5. The bonding arrangement according to claim 1, wherein the retaining element is formed on the position-sensitive element or on the receiving body.

6. The bonding arrangement according to claim 1, wherein the bottom section has a thickness of 20 µm to 500 µm, or of 50 µm to 200 µm, or of about 100 µm.

7. The bonding arrangement according to claim 1, wherein the bottom section is formed as a single piece with and of uniform material with the receiving body or wherein the bottom section is formed as a single piece with and of uniform material with the position-sensitive element.

8. The bonding arrangement according to claim 1, wherein the receiving body has a polymer-based plastic including a BMC.

9. The bonding arrangement according to claim 1, wherein the optical element is a semiconductor light source or a reflector.

10. A method for producing a bonding arrangement for an adhesive bonding of a position-sensitive element to a receiving body of an optical element, the method comprising:
arranging a UV-curable adhesive between the position-sensitive element and the receiving body;
forming a cavity on the receiving body or on the position-sensitive element;
forming a retaining element on the position-sensitive element or on the receiving body;
inserting the retaining element in the cavity;
filling the cavity, at least partially, with the UV-curable adhesive so that the retaining element projects into the UV-curable adhesive; and
irradiating the UV-curable adhesive via UV light through a thin-walled bottom section of the cavity,
wherein the bottom section is provided at a deepest point of the cavity, and an entirety of the bottom section is thin-walled such that the UV-curable adhesive is cured with the UV light that is radiated through the bottom section, and
wherein the cavity is fully enclosed except for an opening at an upper end of the cavity, wherein the opening opposes the bottom section.

11. The method according to claim 10, wherein a structural adhesive is additionally placed in the cavity.

* * * * *